US008537568B2

(12) United States Patent
Tang

(10) Patent No.: US 8,537,568 B2
(45) Date of Patent: Sep. 17, 2013

(54) ELECTRONIC DEVICE WITH ELECTROMAGNETIC SHIELDING FUNCTION

(75) Inventor: Zi-Ming Tang, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 179 days.

(21) Appl. No.: 13/281,628

(22) Filed: Oct. 26, 2011

(65) Prior Publication Data

US 2013/0044451 A1   Feb. 21, 2013

(30) Foreign Application Priority Data

Aug. 19, 2011   (CN) .......................... 2011 1 0239734

(51) Int. Cl.
*H05K 1/11*   (2006.01)

(52) U.S. Cl.
USPC . 361/818; 361/679.56; 361/816; 361/679.55; 455/575.1; 174/350; 174/351; 174/32

(58) Field of Classification Search
USPC ............... 361/807, 679.55, 679.56, 818, 800, 361/816, 799, 753; 174/350, 351, 32; 455/575.1
See application file for complete search history.

(56) References Cited

U.S. PATENT DOCUMENTS

| 4,494,651 | A * | 1/1985 | Malcolm ....................... 206/719 |
| 6,188,017 | B1 * | 2/2001 | August, Jr. .................... 174/350 |
| 6,388,893 | B1 * | 5/2002 | Calderon ...................... 361/818 |
| 6,532,152 | B1 * | 3/2003 | White et al. .................. 361/692 |
| 7,869,206 | B2 * | 1/2011 | Dabov et al. ............. 361/679.55 |
| 2005/0270244 | A1 * | 12/2005 | Lam et al. ..................... 343/702 |
| 2007/0135183 | A1 * | 6/2007 | Templeman et al. ....... 455/575.1 |
| 2009/0067141 | A1 * | 3/2009 | Dabov et al. ................. 361/753 |
| 2009/0256759 | A1 * | 10/2009 | Hill et al. ...................... 343/702 |
| 2010/0061040 | A1 * | 3/2010 | Dabov et al. ............. 361/679.01 |
| 2011/0122562 | A1 * | 5/2011 | Lev et al. ................. 361/679.27 |
| 2011/0164365 | A1 * | 7/2011 | McClure et al. ........... 361/679.3 |
| 2011/0164372 | A1 * | 7/2011 | McClure et al. ......... 361/679.26 |
| 2011/0244930 | A1 * | 10/2011 | Kong et al. ................. 455/575.1 |
| 2011/0255218 | A1 * | 10/2011 | Pakula et al. ............. 361/679.01 |
| 2011/0272088 | A1 * | 11/2011 | Cincotti ....................... 156/247 |
| 2011/0287812 | A1 * | 11/2011 | Joo ............................... 455/566 |
| 2012/0098720 | A1 * | 4/2012 | Hill et al. ...................... 343/725 |
| 2012/0146921 | A1 * | 6/2012 | Park ............................. 345/173 |
| 2012/0176277 | A1 * | 7/2012 | Malek et al. ................. 343/702 |
| 2012/0327324 | A1 * | 12/2012 | Martisauskas et al. ......... 349/58 |

* cited by examiner

*Primary Examiner* — Hoa C Nguyen
*Assistant Examiner* — Robert Brown
(74) *Attorney, Agent, or Firm* — Altis Law Group, Inc.

(57) ABSTRACT

An electronic device includes a housing, a fixed frame, a plurality of conductive foam pieces, and a display panel. The fixed frame is assembled and received within the housing. The fixed frame defines a plurality of fixing grooves adjacent to a periphery of the fixed frame. The conductive foam pieces are assembled within the fixing grooves of the fixed frame, respectively, and are coplanar with the fixed frame. The display panel is flatly mounted on the fixed frame and received within the housing together with the fixed frame. The periphery of the display panel tightly contacts with the conductive foam pieces.

12 Claims, 3 Drawing Sheets

ELECTRONIC DEVICE WITH ELECTROMAGNETIC SHIELDING FUNCTION

BACKGROUND

1. Technical Field

The present disclosure generally relates to electronic devices, and particularly to an electronic device with electromagnetic shielding function.

2. Description of Related Art

A commonly used electronic device, such as a tablet computer, a mobile phone, for example, are often equipped with conductive foam assembled within the electronic device, as an electromagnetic shielding layer, thereby shielding the electromagnetic waves generated within the electronic device and/or preventing the outer electromagnetic waves from disturbing the electronic device. The conductive foam is directly assembled within the electronic device by means of manual assembly technology. However, as the conductive foam has certain thickness and elasticity, in the assembly process, the conductive foam is difficult to maintain alignment with other components assembled within the electronic device, thereby affecting the whole assembling efficiency and the performance of the electronic device.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
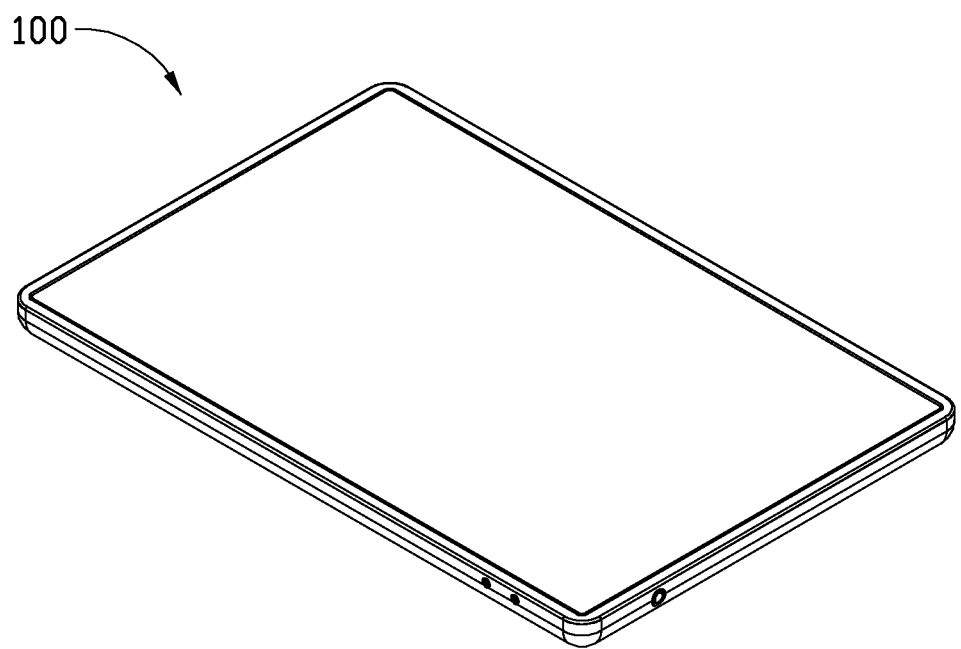
FIG. 1 shows an isometric view of an embodiment of an electronic device.

Referring to FIG. 1, an embodiment of an electronic device 100 is shown. The electronic device 100 may be a portable electronic device, such as a tablet computer, a notebook, an E-book, or a liquid crystal display, for example. In the illustrated embodiment, the electronic device 100 is a tablet computer.

Figure 2:
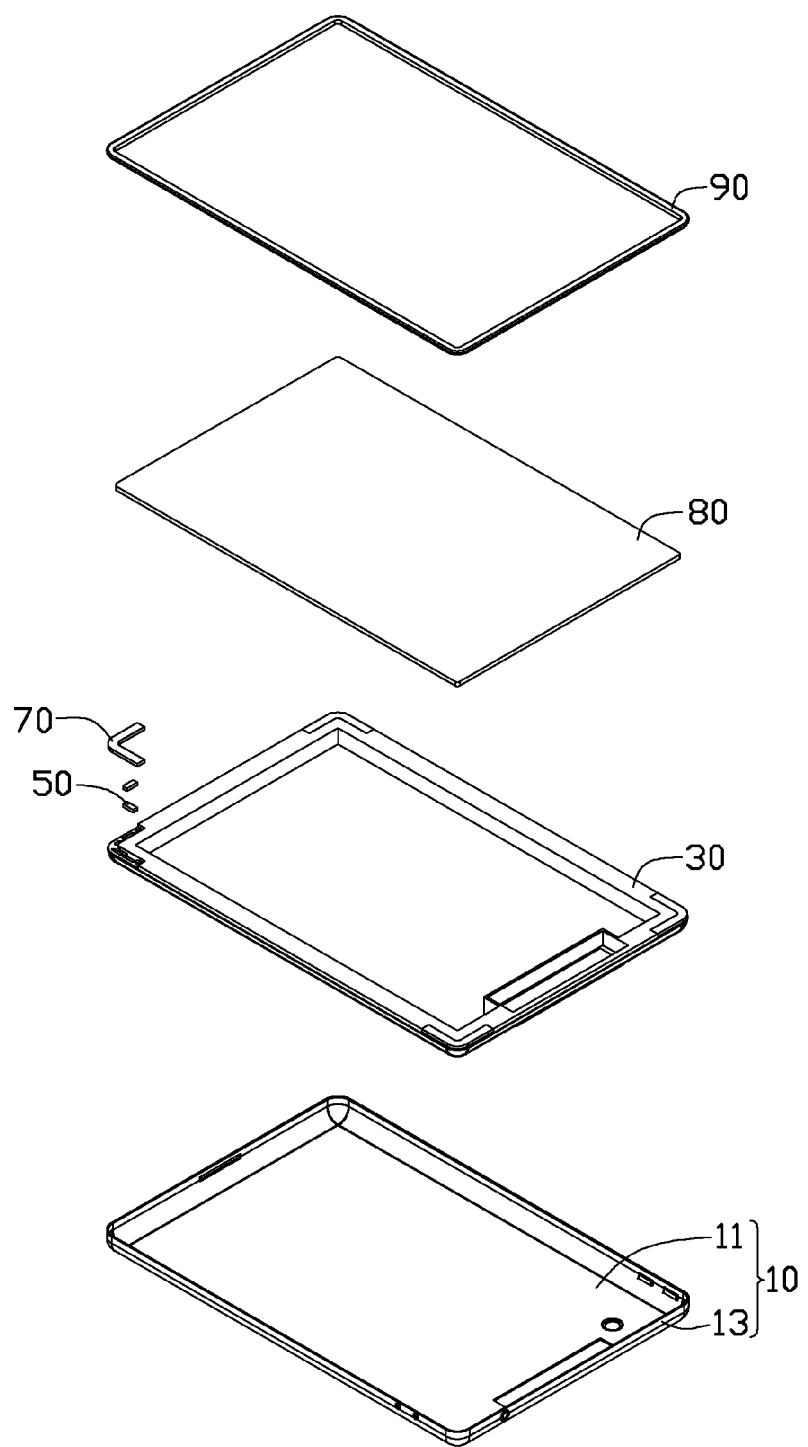
FIG. 2 shows an exploded isometric view of the electronic device of FIG. 1.
Figure 3:
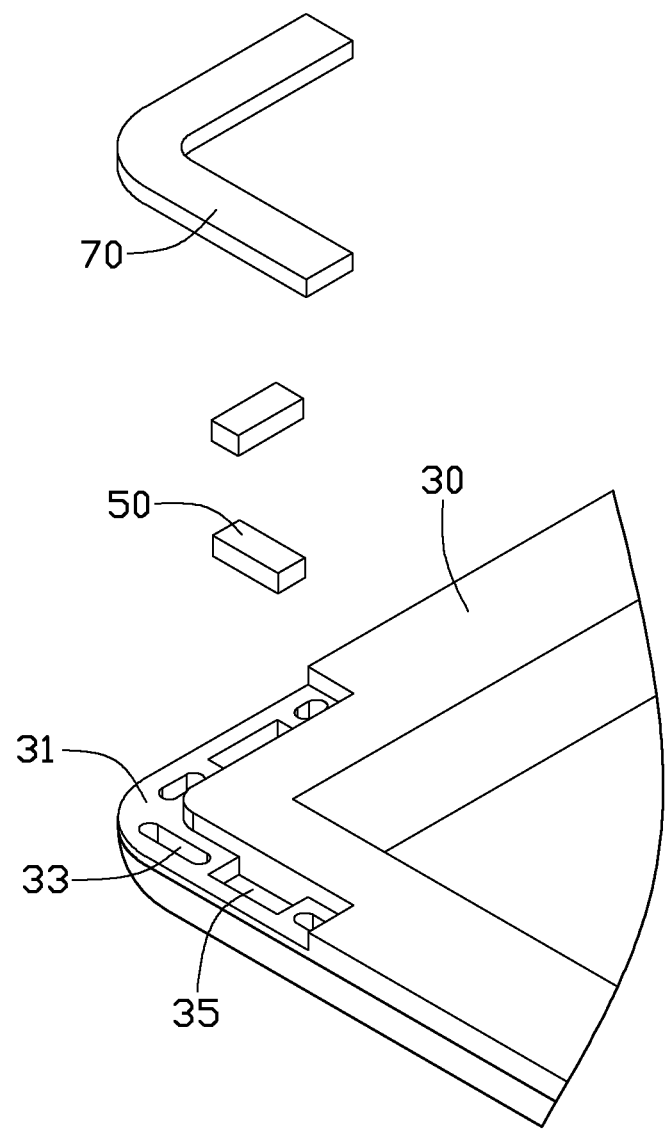
FIG. 3 shows a partial, enlarged, exploded isometric view of one corner of the electronic device of FIG. 2.

Also referring to FIGS. 2 and 3, the electronic device 100 includes a housing 10, a fixed frame 30, a plurality of conductive foam pieces 50, a plurality of strengthening corner pieces 70, a display panel 80, and a mounting frame 90. The fixed frame 30 is assembled and received within the housing 10. The conductive foam piece 50 is assembled to the fixed frame 30 and is positioned adjacent to a periphery of the fixed frame 30 together with the strengthening corner piece 70 and coplanar with the fixed frame 30. The display panel 80 is flatly mounted on the fixed frame 30 and is received within the housing 10 together with the fixed frame 30. A periphery of the display panel 80 tightly contacts with the fixed frame 30 and the strengthening corner pieces 70. The mounting frame 90 is mounted to housing 10 and encloses, and surrounds the display panel 80. The electronic device 100 also includes various other functional modules such as circuit board, for performing specific functions. However, for simplicity, it is not described here.

The housing 10 is substantially rectangular frame shaped, and includes a bottom wall 11 and a peripheral wall 13 extending from the periphery of the bottom wall 11. The peripheral wall 13 and the bottom wall 11 cooperatively define a receiving space (not labeled) for accommodating the corresponding fixed frame 30, the display panel 80 and the other functional modules (not shown).

The fixed frame 30 is a substantially rectangular frame, and is assembled within the housing 10 and positioned adjacent to the peripheral wall 13 of the housing 10 for supporting the display panel 80. A plurality of recessions 31 are recessed from a top surface of the fixed frame 30 and are positioned adjacent to a periphery of the fixed frame 30. In the illustrated embodiment, there are four recessions 31, recessed from four corners of the fixed frame 30, respectively. Each recession 31 is substantially L-shaped and includes a plurality of small troughs 33 separately defined in the bottom surface, for receiving glue. In one embodiment, there are four substantially bar-shaped small troughs 33 separately defined in the bottom surface of each recession 31 of the fixed frame 30. Two substantially rectangular-shaped fixing grooves 35 are separately defined in the bottom surface of each recession 31 together with the four small troughs 33.

The conductive foam pieces 50 are substantially rectangular bar-shaped and are respectively mounted in the fixing grooves 35 of the fixed frame 30, for shielding the electromagnetic waves generated within the electronic device 100 and/or preventing the outer electromagnetic waves disturbing the electronic device 100. The conductive foam piece 50 is made of an elastic and conductive material. Each conductive foam piece 50 has a thickness slightly larger than the depth of one corresponding fixing groove 35 of the fixed frame 30. In the illustrated embodiment, the thickness of the conductive foam piece 50 is substantially 1.33 times as the depth of the fixing groove 35 of the fixed frame 30, such that, as the conductive foam piece 50 is assembled into the corresponding fixing groove 35 of the fixed frame 30, the conductive foam piece 50 is partially exposed from the corresponding fixing groove 35 of the fixed frame 30 and accommodated within the corresponding recession 31 of the fixed frame 30.

The strengthening corner piece 70 is substantially L-shaped and has a dimension substantially the same as that of the recession 31 of the fixed frame 30. The strengthening corner piece 70 is assembled within the recession 31 of the fixed frame 30 and tightly contacts with the conductive foam piece 50 that is assembled within the recession 31, for strengthening the fixed frame 30 of the electronic device 100. In the illustrated embodiment, the strengthening corner piece 70 is a metal piece and assembled within the recession 31 of the fixed frame 30 with glue. In one embodiment, the strengthening corner piece 70 can form a plurality of latching protrusions (not shown) on a bottom surface thereof. And the bottom surface of the corresponding recession 31 can define a plurality of latching slots (not shown), such that, the strengthening corner piece 70 can be fixedly assembled into the recession 31 of the fixed frame 30, with the latching protrusions of the strengthening corner piece 70 latching into the corresponding latching slots of the fixed frame 30.

The display panel 80 is a substantially rectangular liquid crystal display panel and is flatly positioned upon the fixed frame 30 and received within the housing 10 together with the fixed frame 30.

The mounting frame 90 is substantially rectangular and is fixedly mounted to the peripheral wall 13, thereby enclosing the display panel 80.

In assembly, the fixed frame 30 is firstly assembled into and received within the housing 10. The conductive foam piece 50 is inserted and engaged into the corresponding fixing groove 35, respectively, and is partially exposed from the corresponding fixing groove 35. The strengthening corner pieces 70 are fixed into the recessions 31, respectively, with the glue dispensed into the corresponding small troughs 33, and resisting against the conductive foam piece 50 for strengthening the four corners of the housing 10. The display panel 80 is then flatly positioned upon the fixed frame 30 and is received within the housing 10. The mounting frame 90 is finally fixed to the peripheral wall 13, thereby enclosing the display panel 80 and fixing the display panel 80 to the housing 10 to finish the assembly of the electronic device 100.

The electronic device 100 has a maximized electromagnetic shielding performance with simple structure. Since the thickness of each conductive foam piece 50 is slightly larger than the depth of the corresponding fixing groove 35, as the conductive foam piece 50 is mounted into the fixing groove 35, one end of the conductive foam piece 50 is partially exposed from the corresponding fixing groove 35, such that, the strengthening corner pieces 70 are fixed into the recessions 31, and the strengthening corner piece 70 can maintain contact and resist against the corresponding conductive foam piece 50 all the time, thereby efficiently shielding the electromagnetic waves generated within the electronic device 100 and/or preventing the outer electromagnetic waves from disturbing the electronic device 100. The strengthening corner pieces 70 are maintained coplanar with the fixed frame 30. In addition, since the small troughs 33 are defined in the bottom surface of the recessions 31, the glue can be dispensed or dropped into the small troughs 33, and thereby avoiding the glue from spilling from the recession 31.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. An electronic device, comprising:
a housing;
a fixed frame assembled and received within the housing, the fixed frame defining a
plurality of fixing grooves adjacent to a periphery of the fixed frame;
a plurality of conductive foam pieces assembled within the corresponding fixing grooves of the fixed frame, and being coplanar with the fixed frame; and
a display panel flatly mounted on the fixed frame and received within the housing
together with the fixed frame, and a periphery of the display panel tightly contacting with the conductive foam pieces;
wherein each conductive foam piece has a thickness slightly larger than the depth of one corresponding fixing groove of the fixed frame; and
wherein the fixed frame comprises four recessions recessed from four corners of the fixed frame, each recession comprises a plurality of small troughs separately defined in the bottom surface thereof, and two fixing grooves separately defined in the bottom surface of each recession; the conductive foam piece is assembled within the fixing groove of the fixed frame, partially exposed from the corresponding fixing groove of the fixed frame, and accommodated within the corresponding recession of the fixed frame.

2. The electronic device of claim 1, wherein the fixed frame comprises a plurality of recessions recessed from a top surface thereof and positioned adjacent to the periphery of the fixed frame, the fixing grooves are separately defined in the bottom surfaces of the recessions of the fixed frame; the conductive foam piece is assembled within the corresponding fixing groove of the fixed frame, partially exposed from the corresponding fixing groove of the fixed frame, and accommodated within the corresponding recession of the fixed frame.

3. The electronic device of claim 1, wherein a thickness of the conductive foam piece is substantially 1.33 times as the depth of the fixing groove of the fixed frame.

4. The electronic device of claim 1, wherein the electronic device further comprises four strengthening corner pieces, the four strengthening corner pieces are assembled within the four recessions of the fixed frame, respectively, and tightly contact with the corresponding conductive foam pieces, for strengthening the fixed frame.

5. The electronic device of claim 4, wherein, the strengthening corner piece is a metal piece assembled within the recession of the fixed frame via a glue, and the glue is dispensed within the small troughs.

6. The electronic device of claim 4, wherein, the housing comprises a bottom wall and a peripheral wall extending from the periphery of the bottom wall, the peripheral wall and the bottom wall cooperatively define a receiving space for accommodating the corresponding fixed frame and the display panel; the electronic device further comprises a mounting frame, the mounting frame is fixedly mounted to the peripheral wall of the housing, and the mounting frame encloses and surrounds the display panel.

7. The electronic device of claim 4, wherein, the strengthening corner piece is a metal piece assembled within the recession of the fixed frame via glue.

8. The electronic device of claim 1, wherein the conductive foam piece is made of an elastic and conductive material.

9. An electronic device, comprising
a housing comprising a bottom wall and a peripheral wall extending from the periphery of the bottom wall, the peripheral wall and the bottom wall cooperatively defining a receiving space;
a fixed frame assembled and received within the receiving space of the housing,
a plurality of fixing grooves defined in the fixed frame and positioned adjacent to a periphery of the fixed frame;
a plurality of conductive foam pieces assembled within the corresponding fixing grooves of the fixed frame, and being coplanar with the fixed frame;
a display panel flatly mounted on the fixed frame and received within the receiving space of the housing together with the fixed frame, and a periphery of the display panel being tightly in contact with the conductive foam pieces; and
a mounting frame fixedly mounted to the peripheral wall of the housing and surrounding the display panel;
wherein each conductive foam piece has a thickness slightly larger than the depth of one corresponding fixing groove of the fixed frame;
wherein the fixed frame comprises four recessions recessed from four corners of the fixed frame, each recession comprises a plurality of small troughs separately defined in the bottom surface thereof, and two fixing grooves separately defined in the bottom surface of each recession; the conductive foam piece is assembled within the fixing groove of the fixed frame, partially exposed from the corresponding fixing groove of the fixed frame, and accommodated within the corresponding recession of the fixed frame.

10. The electronic device of claim 9, wherein a thickness of the conductive foam piece is substantially 1.33 times as the depth of the fixing groove of the fixed frame.

11. The electronic device of claim 9, wherein the electronic device further comprises a plurality of strengthening corner pieces, the strengthening corner pieces are assembled within the recessions of the fixed frame, respectively, and tightly contact with the corresponding conductive foam piece, for strengthening the fixed frame.

12. The electronic device of claim 11, wherein the conductive foam piece is made of an elastic and conductive material.

\* \* \* \* \*